US012654122B2

(12) United States Patent
Seeberger

(10) Patent No.: US 12,654,122 B2
(45) Date of Patent: Jun. 16, 2026

(54) ZIGZAG-FOLDED NONWOVEN MATERIAL

(71) Applicant: IREMA-FILTER GMBH,
Postbauer-Pavelsbach (DE)

(72) Inventor: Andreas Seeberger, Nuremberg (DE)

(73) Assignee: IREMA-FILTER GMBH,
Postbauer-Pavelsbach (DE)

( * ) Notice: Subject to any disclaimer, the term of this
patent is extended or adjusted under 35
U.S.C. 154(b) by 606 days.

(21) Appl. No.: 17/996,657

(22) PCT Filed: Apr. 23, 2021

(86) PCT No.: PCT/EP2021/060741
§ 371 (c)(1),
(2) Date: Oct. 20, 2022

(87) PCT Pub. No.: WO2021/214324
PCT Pub. Date: Oct. 28, 2021

(65) Prior Publication Data
US 2023/0241541 A1     Aug. 3, 2023

(30) Foreign Application Priority Data

Apr. 24, 2020    (DE) ...................... 10 2020 205 247.6

(51) Int. Cl.
B01D 46/52       (2006.01)
B01D 39/16       (2006.01)
(Continued)

(52) U.S. Cl.
CPC ....... B01D 46/523 (2013.01); B01D 39/1607
(2013.01); B01D 46/0001 (2013.01);
(Continued)

(58) Field of Classification Search
CPC .......................... B01D 46/523; B01D 46/0001;
B01D 46/521; B01D 46/522; B01D
2275/10
See application file for complete search history.

(56) References Cited

U.S. PATENT DOCUMENTS 5,089,202 A * 2/1992 Lippold ............... B01D 46/523
264/DIG. 48
5,290,447 A   3/1994 Lippold
(Continued)

FOREIGN PATENT DOCUMENTS

CN        103046231 A     4/2013
DE        40 04 079 A1    8/1991
(Continued)

OTHER PUBLICATIONS

International Search Report for corresponding International Appli-
cation No. PCT/EP2021/060741 mailed Jul. 16, 2021.
(Continued)

*Primary Examiner* — Robert Clemente
(74) *Attorney, Agent, or Firm* — Niels Haun; Dann,
Dorfman, Herrell & Skillman, P.C.

(57)            ABSTRACT

The invention relates to a method for producing a zigzag-
folded nonwoven material for a filter, wherein the nonwoven
material is produced by a melt-spinning process, comprising
the following work steps:
 folding the nonwoven material by means of a folding
   device, whereby a plurality of folds results, wherein the
   folds divide the nonwoven material into first limbs and
   second limbs such that the nonwoven material is folded
   in zigzag form; and subsequently
 welding a weld region of the first limb of a fold to at least
   one weld region of the second limb of a fold by means
   of a thermal-contact welding process, wherein a welded
   joint is formed between the two facing sides of the
   limbs of a fold. The invention furthermore relates to a
   corresponding apparatus and a corresponding nonwo-
   ven material.

10 Claims, 5 Drawing Sheets

Figure 1:
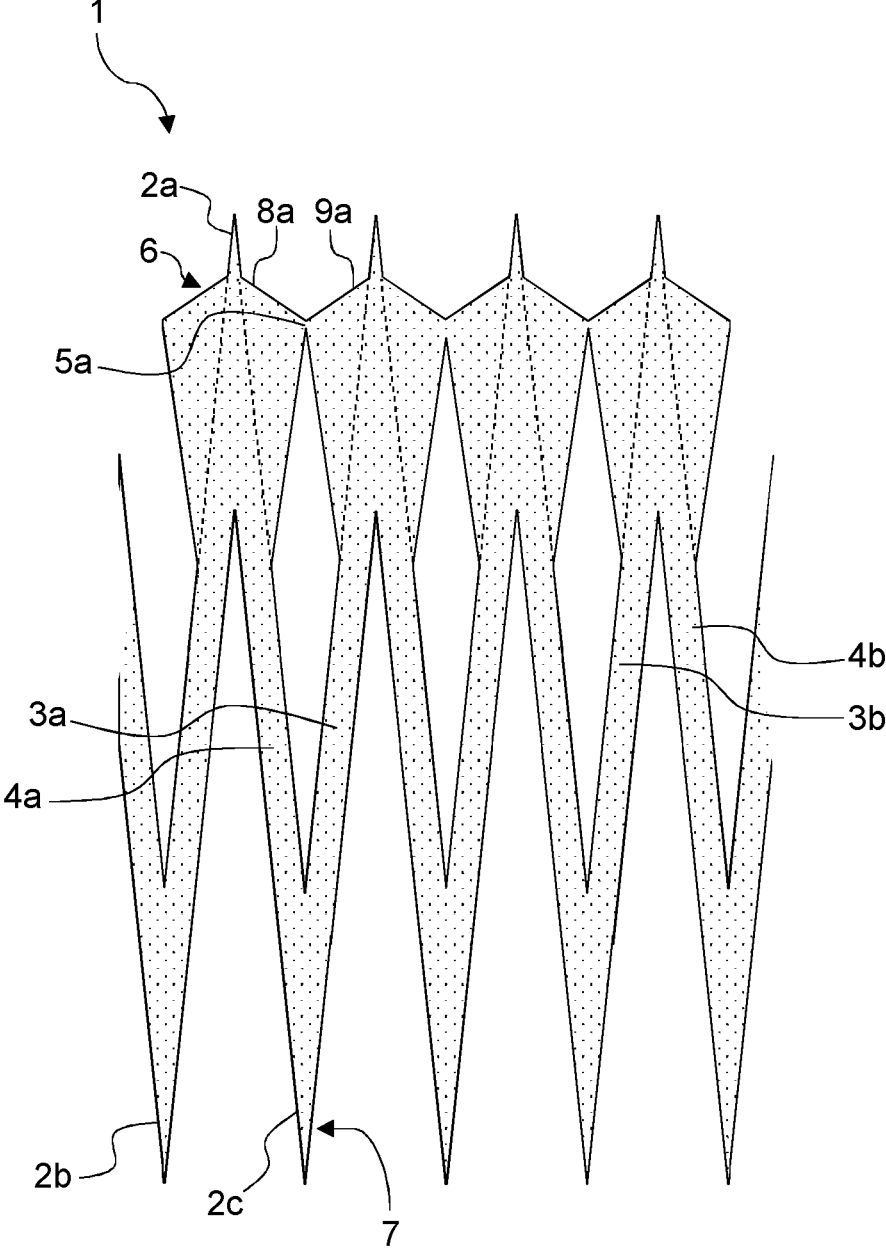

(51) Int. Cl.

| | | |
|---|---|---|
| *B01D 46/00* | (2022.01) | |
| *D04H 1/559* | (2012.01) | |
| *D04H 1/56* | (2006.01) | |
| *D04H 1/724* | (2012.01) | |

(52) U.S. Cl.
CPC ............... *D04H 1/559* (2013.01); *D04H 1/56* (2013.01); *D04H 1/724* (2013.01); *B01D 2239/0618* (2013.01); *B01D 2239/0627* (2013.01); *B01D 2239/065* (2013.01); *B01D 2239/10* (2013.01); *B01D 2239/1291* (2013.01); *B01D 2275/10* (2013.01); *D10B 2505/04* (2013.01)

(56) References Cited

U.S. PATENT DOCUMENTS

| | | | |
|---|---|---|---|
| 5,792,242 A * | 8/1998 | Haskett ................... | B32B 5/022 |
| | | | 55/528 |
| 6,428,594 B1 | 8/2002 | Hintenlang et al. | |
| 2017/0217557 A1 | 8/2017 | Yahagi et al. | |
| 2017/0259201 A1 | 9/2017 | Freiler | |

FOREIGN PATENT DOCUMENTS

| | | |
|---|---|---|
| DE | 100 19 505 A1 | 10/2001 |
| DE | 10 2014 117 506 A1 | 6/2016 |
| EP | 1 080 770 A2 | 3/2001 |
| EP | 1 080 770 A3 | 6/2002 |
| EP | 1952873 | 8/2008 |
| EP | 3 061 512 A1 | 8/2016 |

OTHER PUBLICATIONS

Written Opinion for corresponding International Application No. PCT/EP2021/060741 dated Jul. 16, 2021.

German Search Report dated Nov. 11, 2020 for corresponding German Application No. 10 2020 205 247.6.

European Office Action dated Dec. 20, 2023 for corresponding European Application No. 21 725 708.8 and English translation.

Office Action dated Sep. 6, 2023 for corresponding Brazilian application No. 11 2022 021185 6.

First Examination Report dated Sep. 6, 2023 issued by the Malaysia Patent Office for corresponding Malaysia application No. PI 2022005926.

Second Office Action dated Feb. 25, 2025 issued for corresponding Saudi Arabian application No. 522441015 and English Translation.

First Office Action dated Sep. 6, 2023 for corresponding Saudi Authority Application No. 522441015 and English translation.

Office Action dated Feb. 25, 2025 issued by the Indian Patent Office for corresponding Indian patent application No. 202217060269.

* cited by examiner

ZIGZAG-FOLDED NONWOVEN MATERIAL

CROSS-REFERENCE TO RELATED APPLICATIONS

This application is a national stage entry of International Application No. PCT/EP2021/060741 filed on Apr. 23, 2021, which claims the benefit of priority to German Application No. DE 10 2020 205 247.6, filed Apr. 24, 2020, the entire disclosures of which are hereby incorporated herein by reference.

The invention relates to a zigzag-folded nonwoven material for a filter, a method for producing a zigzag-folded nonwoven material for a filter, and an apparatus for producing a zigzag-folded nonwoven material for a filter.

Nonwoven materials for filters are used in many various fields of application. For example, one use is in building ventilation systems to enable fresh air filtering. Preferably, they are thereby so-called particulate filters designed to separate particulate matter from the air.

Pollen or even allergens, for example, are thereby filtered from the incoming ambient air so that only low concentrations of same are introduced into the building. The nonwoven material exhibits various properties to that end to allow optimized filtration depending on application.

Usually, nonwoven material is produced using a so-called melt-spinning process such as for example a spun-bond process or a melt-blown process.

In order to create a filter with a large surface area over a small space, it is common to fold filter material so as to produce a zigzag structure, which is also referred to as a pleated structure.

Spacing apart folds of a filter by means of projections and adhesive coatings is known from the prior art DE 40 04 079 A1. Forming spacers from embossed dimples/projections of opposing folds glued together is known from the prior art DE 100 10 505 A1. Connecting embossings to one another by means of non-adhesive joining is known from the prior art DE 10 2014 117 506 A1.

One task of the invention is that of improving a zigzag-folded nonwoven material for a filter. A particular task of the invention is providing a zigzag-folded nonwoven material of increased stability for a filter.

This task is solved by a nonwoven material, a method for processing a nonwoven material as well as an apparatus for producing a nonwoven material according to the independent claims. Advantageous embodiments of the invention are claimed in the dependent claims.

A first aspect of the invention relates to a method for producing a zigzag-folded nonwoven material for a filter, wherein the nonwoven material is produced by means of a melt-spinning process, comprising the following work steps:

folding the nonwoven material by means of a folding device, whereby a plurality of folds results, wherein the folds divide the nonwoven material into first limbs and second limbs such that the nonwoven material is folded in zigzag form; and subsequently welding one weld region of the first limb of a fold to at least one weld region of the second limb of a fold in a plastic welding process, wherein a welded joint is formed between the two facing sides of a fold's limbs.

A second aspect of the invention relates to an apparatus for producing a zigzag-folded nonwoven material for a filter, particularly a nonwoven material according to the first aspect of the invention, and/or for realizing a method according to the second aspect of the invention, which comprises:

at least one folding device configured to form a plurality of folds which divide the nonwoven material into first limbs and second limbs such that the nonwoven material is folded in zigzag form; and at least one welding device configured to weld a weld region of the first limb of a fold to at least one weld region of the second limb of a fold between the limbs of a fold in the folded state by means of a plastic welding process, wherein a welded joint is formed between the two facing sides of a fold's limbs.

A third aspect of the invention relates to a zigzag-folded nonwoven material for a filter comprising a plurality of folds which divide the nonwoven material into first limbs and second limbs, wherein a materially bonded welded joint connecting the first limb to the second limb is in each case arranged between a first limb and a second limb of a fold in at least one weld region, whereby weld regions which connect two limbs of a fold are only formed on facing sides of the fold's limbs, wherein the surface at least in the weld region of facing sides of a fold's limbs is changed by the welded joint and the surface of the side of the fold's limbs opposite from the weld region is not changed by the welded joint.

The invention is in particular based on the approach of producing a zigzag-folded nonwoven material for a filter by welding together the limbs of a fold. This thereby ensures high filter medium stability.

The invention thereby provides for using a thermal-contact welding process to only process the nonwoven material from one side of the nonwoven material during welding. In order to form a weld region, joining surfaces on the inner limb sides are thereby heated such that the nonwoven material plasticizes on the surface of the weld regions. The joining surfaces are thereafter brought into contact so that a welded joint is formed in the weld region by means of which the limbs of the fold are preferably no longer separable from one another without being destroyed. In so doing, thermal contact only welds one side of the filter medium. A welding counterpoint is not necessary. On the one hand, this makes for low expenditure when producing such a nonwoven material. For example, this enables dispensing with the use of adhesive or other fixing means which would be associated with further costs. On the other hand, the welding has barely any impact on the effective filter area. Particularly compared to filter materials in which limbs are joined together by adhesive beads and possibly spaced apart, costs can be up to 15% lower and weight even up to 30% lower.

According to the invention, that side of a fold's limbs on the opposite side from where the weld regions are arranged is substantially unaffected by the welded joint. The function of the nonwoven material, namely in particular fluid and/or gas/gas mixture filtration, is thereby substantially unaffected. Furthermore, the welded joint substantially prevents the weld regions from unintentionally separating and enables the nonwoven material to retain its zigzag-folded shape during use. The nonwoven material is thereby very stable as well as durable and thus suitable for use in various fields of application.

In this context, of particular importance for the invention is the nonwoven material not being welded until after being folded; i.e. plasticization of the weld region surfaces does not occur until the two limbs of a fold have already been folded along a folding edge.

In this state, the two facing surfaces of the limbs with the weld regions are brought into close proximity to one another or even abut each other. The weld regions of the facing surfaces can thus be plasticized in close proximity to one another via a welding device. For this reason, they can be joined at this location immediately after the welding device has left a plasticized spot. On the one hand, this enables very good control of the joining process between the weld regions and, on the other, the energy used for plasticization can be reduced to just enough of a minimum to produce a welded joint or weld seam respectively between the limbs. When metering the energy being introduced, allowance does not need to be made for weld region cooling phases, or only made to a slight extent, due to the spatial proximity of the two limbs as already realized. It is thereby preferably also possible to ensure that a surface opposite from the weld regions is not impacted by the (thermal) energy introduced by welding or welded joints respectively. This is based on being able to regulate particularly low metering by virtue of the fold that already exists during the welding process.

In the folded state, or with raised folds respectively, pressure can also be applied to the limbs to be welded immediately after plasticization. Only a little thermal energy therefore needs to be selectively furnished and the surfaces or respectively weld regions to be joined can be kept small.

The invention enables particularly stable and yet small weld seams to be realized. On the other hand, the energy required thereto can be reduced to a minimum. The weld seams thereby preferably attain strength values corresponding to a seam created with threads.

Carrying out a plastic welding process on limbs already in the folded state is not known from the prior art.

A longitudinal direction of a fold in terms of the invention preferably extends substantially along a folding edge of the fold.

A bulge in terms of the invention is preferably a rise in the initially substantially flat nonwoven material. Further preferably, a bulge is an embossment.

In terms of the invention, a welded joint-induced change in the surface is a change of a structure and/or surface property of at least part of the surfaces in the weld region compared to surfaces outside of the weld region.

In one preferential embodiment of the method, a heating element or a plurality of heating elements enters between the limbs of a fold and heats the regions, whereby the regions come into contact as the heating element approaches and form at least one weld region.

Using a heating element enables particularly well metered heat to be delivered to the weld regions.

A heating element in terms of the invention serves in applying thermal energy. Preferably, the heating element is configured for thermal-contact welding, ultrasonic welding, infrared welding and/or laser welding.

In a further preferential embodiment of the method, folds are welded on both sides of the nonwoven material. This thereby enables achieving particularly high nonwoven material strength in flat filter configurations. When such strength is not important, folds can also be welded on only one side of the nonwoven material in an alternative embodiment. A drum filter configuration can thereby be realized by means of the nonwoven material.

In a further preferential embodiment, the method comprises the following further work step: embossing at least one bulge in the first limb and/or at least one bulge in the second limb of a fold, wherein the bulges face each other.

In a further preferential embodiment of the method, the heating element enters between the limbs at least substantially in a direction perpendicular to the direction of manufacture of the nonwoven material and an average value of the travel speed of the heating element is greater, preferably 10 to 100 times greater, than a travel speed of the already folded nonwoven material in the direction of manufacture. This thereby ensures the production of the cleanest and straightest possible welded joint without significant tension.

In a further preferential embodiment of the method, the heating element additionally moves in the nonwoven material's direction of manufacture. The heating element therefore preferably realizes an overall circular or eccentric movement. This thereby enables a higher transport speed of the folded nonwoven material in the direction of manufacture and thus also a higher production speed.

The features and advantages described in relation to the first aspect of the invention and its advantageous embodiment also apply accordingly to the second and third aspect of the invention and their advantageous embodiment and vice versa.

In one preferential embodiment of the apparatus, the welding device comprises a heating element which is insertable between the limbs and heats the regions, whereby the regions come into contact as the heating element approaches and form a weld region.

In a further preferential embodiment of the apparatus, the welding device additionally comprises a counter-welding element, in particular a welding anvil, which is configured to be inserted between the limbs of an adjacent fold such that the heating element and the counter-welding element enclose the at least one weld region. Doing so enables defined and precise welds to be achieved.

In a further preferential embodiment, the apparatus comprises a second welding device and is designed such that the heating elements of the two welding devices are inserted between the limbs from opposite sides of the nonwoven material. Providing the second welding device enables folds oriented in opposite directions to be welded at the same time.

In a further preferential embodiment, the apparatus further comprises at least one embossing device which is configured to emboss at least one bulge in the first limb and/or at least one bulge in the second limb of a fold such that the bulges face each other.

In a further preferential embodiment, the at least one welding device is furthermore configured to move the heating element in the direction of the nonwoven material's manufacture. As previously explained, higher production speeds can thereby be realized.

In one preferential embodiment of the nonwoven material, the welded joint connecting two limbs of a fold only changes a surface structure on the facing sides of the limbs of the folds compared to surfaces outside of the weld region.

Therefore, only the structure of the nonwoven material on the side of the nonwoven material on which the welded joint is formed is affected. The welding does not affect the regions of the sides of fold limbs facing away from the weld region. This can thus achieve the filtering action of the nonwoven material being substantially unaffected. Only the regions of the nonwoven material on which weld regions are formed are affected in terms of the filtering action.

In a further preferential embodiment of the nonwoven material, at least one surface of the nonwoven material exhibits a structuring of in particular diamond-shaped and/or honeycombed form.

This structuring benefits the production of the welded joint. Moreover, the structuring preferably reinforces the nonwoven material. For example, added reinforcement of the nonwoven material can be afforded by means of a grid in latticed form as with a crystalline object. In particular, diamond-shaped, honeycombed and/or generally polygonal structures thereby prove to be particularly stable structures.

In a further preferential embodiment of the nonwoven material, a plurality of weld regions of defined length and at least substantially perpendicular to the longitudinal direction of the fold are formed between the limbs of a fold.

This enables additional filter cavities or filter channels to be formed. Filtering can thus take place not only in the longitudinal direction of the fold but also transversely thereto. Particularly efficient filtering is thereby achieved.

For example, a fluid or gas/gas mixture to be filtered can thereby also be filtered in multiple flow directions. In particular, the direction of flow in which the fluid or gas/gas mixture to be filtered flows is of negligible relevance with respect to optimized filtering.

A plastic welding process in terms of the invention is preferably a welding by local plasticizing and subsequent bringing of joining surfaces of, in particular large-area, plastic structures to be connected into contact. Further preferably, a welded joint produced via a plastic welding process is formed such that two structures which are welded together cannot be separated non-destructively. Further preferably, the plasticizing can be realized by thermal-contact welding, laser welding, ultrasonic welding or infrared welding.

In a further preferential embodiment, the weld regions are arranged on at least one bulge in the first limb and/or on at least one bulge in the second limb of a fold, wherein the bulges face one another.

Doing so can reduce, in particular prevent, tensile loads and/or compressive loads acting on the welded joints in the weld regions due to the nonwoven material. They commonly occur due to the deformations of the nonwoven material caused by the welded joints.

Preferably, one bulge or multiple bulges can be arranged on only a first side of the nonwoven material. Alternatively and/or additionally, one bulge or multiple bulges can be arranged on an opposite second side of the nonwoven material from the first side.

It is also possible for the bulges to be alternately arranged on the first and the second side of the nonwoven material or in a completely different pattern. Furthermore, a random arrangement of the bulges can likewise be provided in order to achieve e.g. a substantially uniformly distributed arrangement of the bulges.

In a further preferential embodiment of the nonwoven material, the at least one bulge of the first limb and/or the second limb of a fold is formed with a defined length and at least substantially perpendicular to the longitudinal direction of the fold.

This in particular enables the weld regions to be formed substantially at or on the bulges so as to further reduce tensile loads and/or compressive loads.

In a further preferential embodiment of the nonwoven material, a bulge of the first limb and a bulge of the second limb of a fold are arranged substantially opposite one another.

This can thereby also reduce, in particular prevent, tensile loads and/or compressive loads resulting from the geometry of the nonwoven material. Particularly when the bulges of the first limb and the second limb are substantially opposite each other, this makes it possible for a more obtuse angle of the respective fold to be formed than when the bulges are formed asymmetrically to one another or not present. Fluid and/or gas/gas mixture filtration can thus be better adapted.

In a further preferential embodiment, the bulge of the first limb and/or the bulge of the second limb of a fold rises, in particular continuously or gradually, starting from the fold, whereby preferably the rise of the bulge of the first limb and/or the second limb is substantially lowest at the fold.

On the one hand, this makes it possible for weld regions which are preferably arranged on the bulges to be subjected to no or only minor tensile loads and/or compressive loads. On the other hand, the filtering action of the nonwoven material can thereby be further improved since further flow spaces are thereby formed and thus a direction of flow of a gas or fluid to be filtered is less relevant in terms of optimized filtering.

In a further preferential embodiment of the nonwoven material, at least the surface in the weld region of facing sides of a fold's limbs and at least the surface of the area of the side of a fold's limbs opposite from the weld region exhibit a different structure.

Preferably, those areas designed as weld regions have a nonwoven material fiber structure optimized for the welded joint. In contrast, the surface of the areas arranged on the side opposite from the weld region is optimized in particular for filtering and accordingly exhibits a different structure.

Furthermore, the nonwoven material can thus, for example, be adapted to a direction of flow for filtering a fluid or gas. Alternatively or additionally, other filter properties such as the minimum permeable particle size of a fluid or gas to be filtered can also be adapted in this way.

In a further preferential embodiment, the nonwoven material is formed from at least two layers.

The nonwoven material can on the one hand thereby be formed such that the surfaces of facing sides of a fold's limbs are optimized for a welded joint. The filtration properties of the second layer can furthermore be optimized for filtering.

Figure 2:
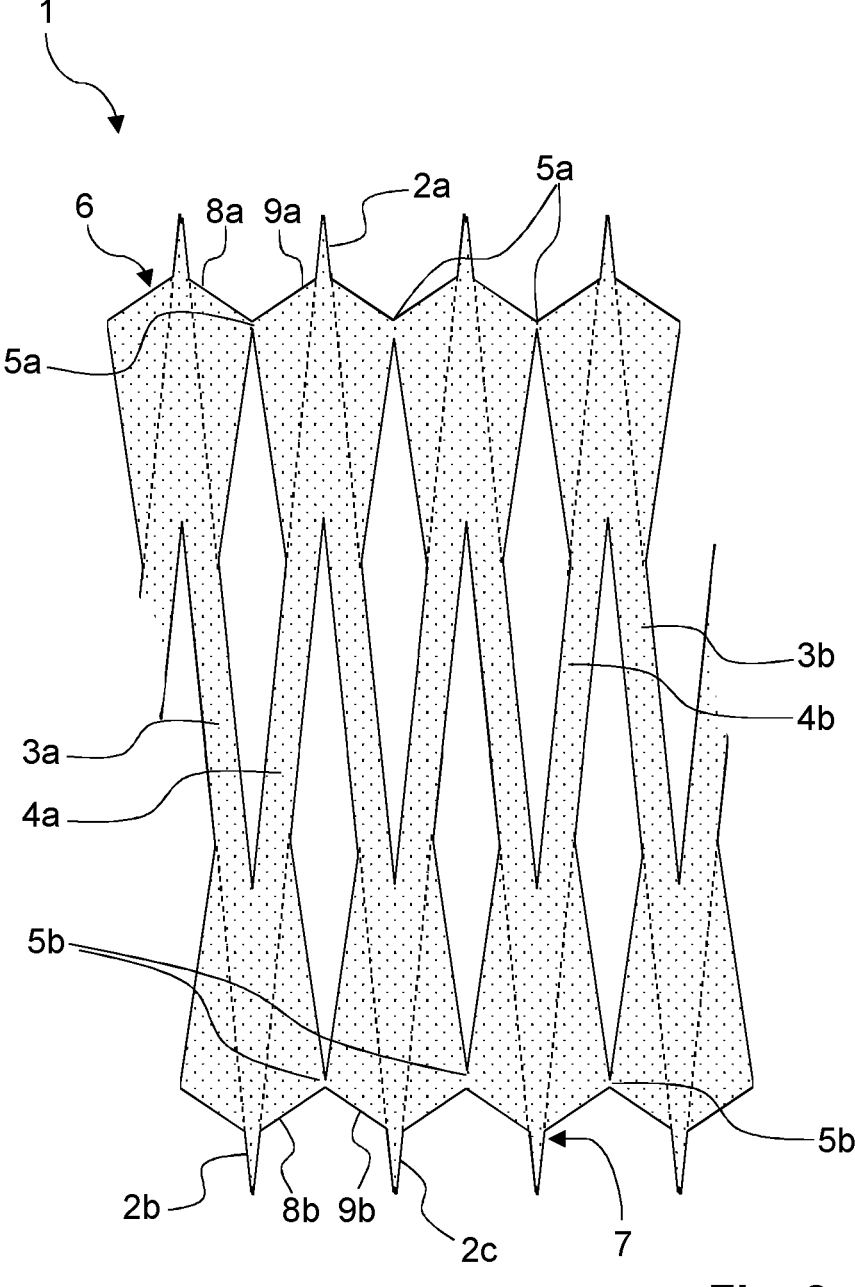
Figure 3:
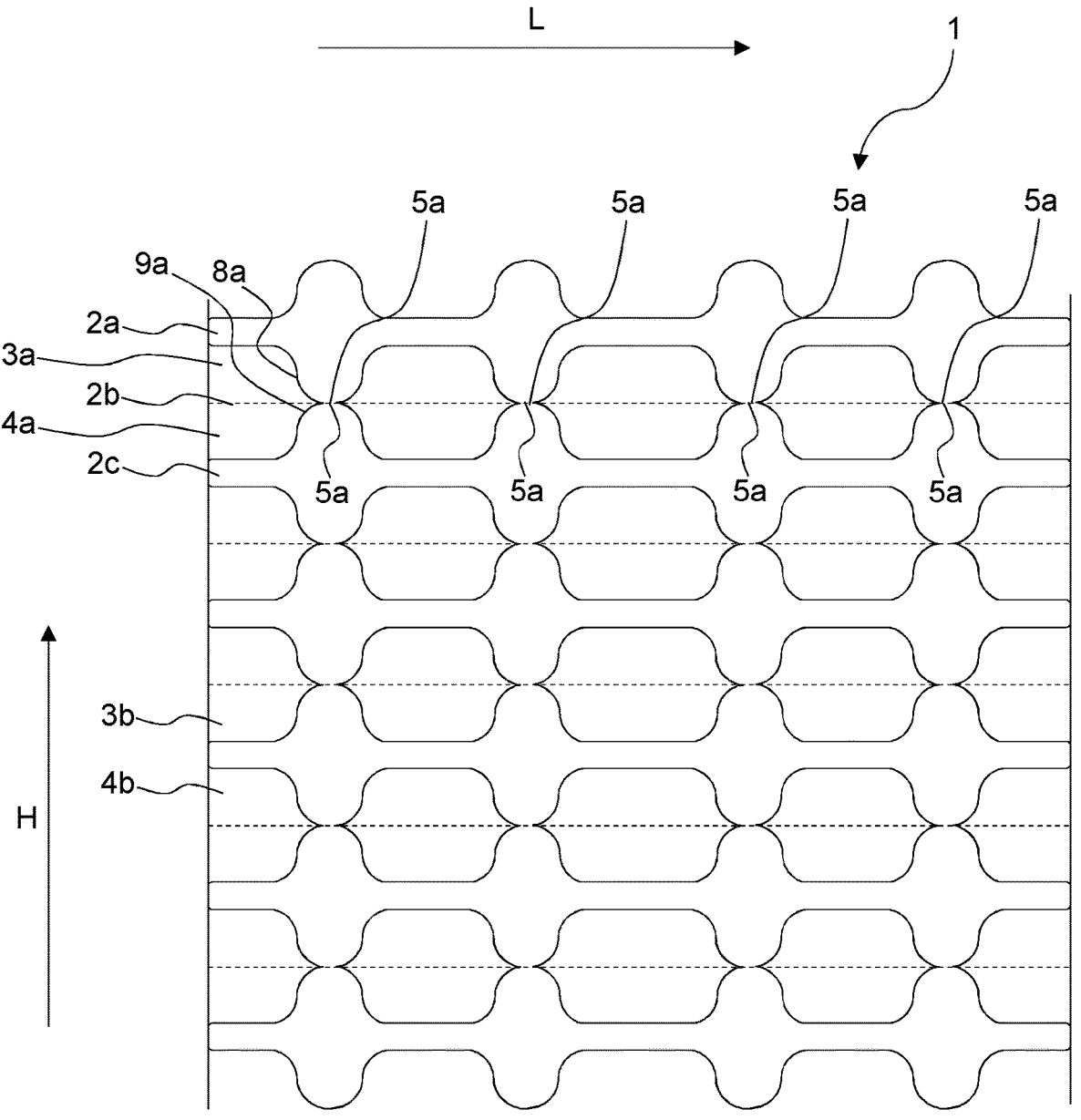
Figure 4:
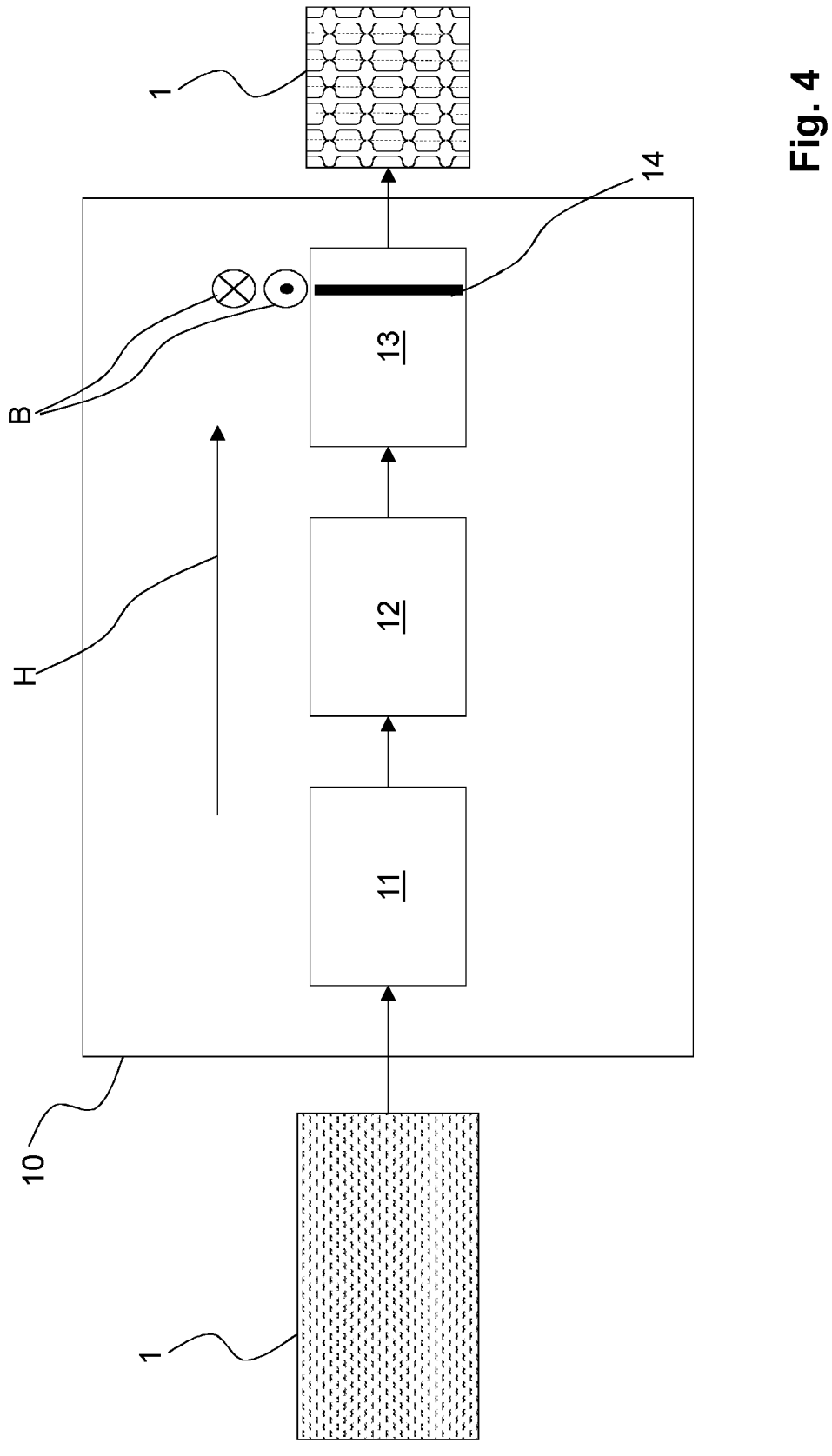
Figure 5:
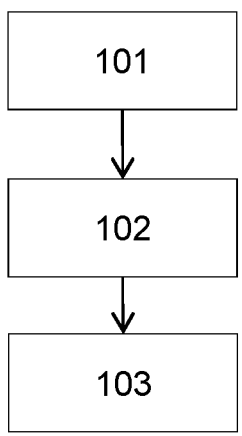

Further features, advantages and possible applications of the invention derive from the following description of exemplary embodiments in conjunction with the figures in which the same reference numerals are used for the same or corresponding elements of the invention. Shown therein at least partly schematically:

FIG. 1 an exemplary embodiment of a zigzag-folded nonwoven material for a filter in side view;

FIG. 2 a further exemplary embodiment of a zigzag-folded nonwoven material for a filter in side view;

FIG. 3 an exemplary embodiment of a zigzag-folded nonwoven material for a filter in top plan view;

FIG. 4 an exemplary embodiment of an apparatus for producing a zigzag-folded nonwoven material; and FIG. 5 an exemplary embodiment of a method for producing a zigzag-folded nonwoven material.

FIG. 1 shows an exemplary embodiment of a zigzag-folded nonwoven material 1 for a filter in side view. The nonwoven material 1, which has preferably been produced by means of a so-called melt-spinning process such as a spun-bond process or a melt-blown process, exhibits a plurality of folds 2a, 2b, 2c which divide the nonwoven material 1 into first limbs 3a, 3b and second limbs 4a, 4b.

The folds 2a, 2b, 2c preferably run at least substantially parallel to each other. In order to obtain a zigzag-folded configuration of the nonwoven material 1, the folds 2a, 2b, 2c are thereby alternatingly folded in oppositely disposed folding edges. So doing thus achieves an accordion-shaped or zigzagged configuration of the nonwoven material 1.

A respective materially bonded connection is arranged in at least one weld region 5a, 5b between each first limb 3a, 3b and second limb 4a, 4b of a fold 2a, 2b, 2c. The weld regions 5a, 5b are thereby only formed between the limbs 3*a*, 3*b*, 4*a*, 4*b* of a fold 2*a*, 2*b*, 2*c* of facing sides of the limbs 3*a*, 3*b*, 4*a*, 4*b* of a fold 2*a*, 2*b*, 2*c*.

In particular, the surface of facing sides of the limbs 3*a*, 3*b*, 4*a*, 4*b* of a fold 2*a*, 2*b*, 2*c* is locally welded by the materially bonded connection, whereby the welding does not affect the regions on the respective far side from the weld region 5*a*, 5*b*.

As shown in this exemplary embodiment, bulges 8*a*, 9*a* are formed on the fold 2*c* or the weld region 5*a* respectively in the upper region. One respective bulge 8*a* is thereby formed in the first limb 3*a* and one respective bulge 9*a* in the second limb 4*a* of the fold 2*c*, wherein the bulges 8*a*, 9*a* are formed facing or in the direction of each other.

Preferably, the bulge 8*a* of the first limb 3*a* und and/or the bulge 9*a* of the second limb 4*a* of the fold 2*c* thereby rises starting from the fold 2*c*. Further preferably, this ensues continuously or gradually. In addition, the rise of the bulge 8*a*, 9*a* of the first limb 3*a* and/or the second limb 4*a* is substantially lowest/smallest at the fold 2*c*.

Further preferably, the bulges 8*a*, 9*a* can be designed as plateaus formed from a layer of the nonwoven material 1. Preferably, this layer can comprise a polymer or a polymer mixture having a lower melting point than other layers of the nonwoven material 1. Further preferably, such a layer can cover the entire surface of one or both sides of the nonwoven material.

FIG. 2 shows a further exemplary embodiment of a zigzag-folded nonwoven material 1 for a filter in side view. This exemplary embodiment differs in comparison to the exemplary embodiment of FIG. 1 in that bulges 8*b*, 9*b* are also arranged on the folds 2*b*, 2*c* arranged at the bottom in order to permanently connect the first limbs 3*a*, 3*b* and second limbs 4*a*, 4*b* of a fold 2*b*, 2*c* via welding.

Alternatively, the nonwoven material 1 can be designed such that a bulge 8*a*, 8*b*, 9*a*, 9*b* is only arranged on one of the two limbs 3*a*, 3*b*, 4*a*, 4*b* of a fold 2*a*, 2*b*, 2*c*. Doing so substantially reduces the manufacturing expenditure involved in producing the bulges 8*a*, 8*b*, 9*a*, 9*b*.

At least the surface of mutually facing sides of the limbs 3*a*, 3*b*, 4*a*, 4*b* of a fold 2*a*, 2*b*, 2*c* in the weld region 5*a*, 5*b* and at least the region of the surface of the side of the limbs 3*a*, 3*b*, 4*a*, 4*b* of a fold 2*a*, 2*b*, 2*c* opposite from the weld region 5*a*, 5*b* can thereby exhibit a different structure.

Furthermore, at least the side region of the limbs 3*a*, 3*b*, 4*a*, 4*b* of a fold 2*a*, 2*b*, 2*c* opposite from the weld region 5*a*, 5*b* comprises a grid. This is preferably of polygonal configuration. A diamond shape, and in particular a honeycomb configuration, to the grid has proven particularly suitable.

Particularly in order to form a first surface 6, which is preferably of grid-shaped design and different from the second surface 7 opposite from the first surface 6, the nonwoven material 1 comprises at least two layers. Particularly a first layer thereby forms the first surface 6 and a second layer forms the second surface 7 of the nonwoven material 1 opposite from the first surface 6.

Preferably, two adjacent folds 2*a*, 2*b*, 2*c* are distanced by at least approximately 10 mm, preferentially by at least approximately 14 mm, particularly preferentially by at least approximately 17 mm, and most preferentially by at least approximately 20 mm. Alternatively, the distance can also be larger, approximately 30 mm or more. Furthermore, the distances between two adjacent folds 2*a*, 2*b*, 2*c* can also be irregular to one another.

To produce a flat filter, the surfaces of the weld regions 5*a* on the one side of the nonwoven material 1 as well as the surfaces of the weld regions 5*b* on the other side of the nonwoven material 1 are preferably welded together.

Depending on the individual application, however, forming only one weld region type, 5*a* or 5*b*, may also suffice with respect to the strength of such a filter. To produce a drum filter, in which the folded nonwoven material 1 is in an annular arrangement, generally only one type of welding region, 5*a* or 5*b*, is even ever formed.

FIG. 3 shows an exemplary embodiment of a zigzag-folded nonwoven material 1 for a filter in top plan view. The bulges 8*a*, 8*b*, 9*a*, 9*b* are formed such that the weld regions 5*a*, 5*b*, particularly the welded joints, are located in the region of the bulges 8*a*, 8*b*, 9*a*, 9*b*. This preferably reduces tensile and compressive loads on the welded joints since the first and second limb 3*a*, 3*b*, 4*a*, 4*b* of a fold 2*a*, 2*b*, 2*c* do not have to be additionally deformed to each other.

In this exemplary embodiment, the bulges 8*a*, 8*b*, 9*a*, 9*b*, the weld regions 5*a*, 5*b* or respectively folds 2*a*, 2*b*, 2*c* are formed in substantially uniform distribution. There can, however, also be an irregular distribution to the bulges 8*a*, 8*b*, 9*a*, 9*b* and/or weld regions 5*a*, 5*b* and/or folds 2*a*, 2*b*, 2*c*. In particular, an asymmetrical arrangement of the folds 2*a*, 2*b*, 2*c* relative to each other is also possible.

Illustratively, a first bulge 8*a* is formed below the depicted uppermost first fold 2*a*, same being substantially opposite from a bulge 9*a* above the depicted third fold 2*c*. The first bulge 8*a* is formed on a first limb 3*a* of the first fold 2*a* and the second bulge 9*a* is formed on a second limb 4*a* of the third fold 2*c*. A weld region 5*a* is thereby arranged at the contact area of the first bulge 8*a* and the second bulge 9*a* in which a welded joint materially bonds the first bulge 8*a* to the second bulge 9*a*.

A second fold 2*b* is arranged between the first fold 2*a* and the third fold 2*c* which is illustrated by a dashed line and folded or respectively creased in the opposite direction to the first fold 2*a* and the third fold 2*c*. Only a first side or respectively surface of the nonwoven material 1 is visible in this top plan view of the nonwoven material 1. It would thus in principle also be possible for a similar configuration of two adjacent folds 2*a*, 2*b*, 2*c* to be formed on the other side/surface of the nonwoven material 1 as is found between the first fold 2*a* and the third fold 2*c*.

A plurality of weld regions 5*a*, 5*b* of a defined length and at least substantially perpendicular to the longitudinal direction L of the folds 2*a*, 2*b*, 2*c* is preferably furthermore formed between the limbs 3*a*, 3*b*, 4*a*, 4*b* of a fold 2*a*, 2*b*, 2*c*, whereby such a configuration is not visible in this top plan view. Further preferably, the bulges 8*a*, 8*b*, 9*a*, 9*b* of the first limb 3*a*, 3*b* and/or of the second limb 4*a*, 4*b* of a fold 2*a*, 2*b*, 2*c* are likewise formed at a defined length and at least substantially perpendicular to the longitudinal direction L of the folds 2*a*, 2*b*, 2*c*.

The arrow H indicates a common direction of manufacture of a folded nonwoven material. The nonwoven material, which is generally stored as a rolled product, is folded substantially transverse to its two edges along a production line dictating the direction of manufacture H.

FIG. 4 shows an exemplary embodiment of an apparatus 10 for producing a zigzag-folded nonwoven material 1 for a filter.

This apparatus 10 as well as the block diagram according to FIG. 5 is used in explaining an exemplary embodiment of a method 100 for producing a zigzag-folded nonwoven material, wherein the limbs of the folds are fixed to one another by means of a materially bonded welded joint.

During the production method 100, the nonwoven material 1 successively passes through the individual stations of the apparatus 10 in the direction of manufacture H. The method 100 thereby comprises at least the successive working steps of folding 102 and welding/joining 103. Preferably, the method 100 also has a work step of embossing 101 the nonwoven material 1 prior to folding.

The apparatus 10 preferably comprises an embossing device 11 which is configured to emboss 101 at least one bulge 8a, 8b in a first limb 3a, 3b and/or at least one bulge 9a, 9b in a second limb 4a, 4b of a fold 2a, 2b, 2c, in particular prior to the folding, wherein the first limb 3a, 3b is faced toward the second limb 4a, 4b. In order to form one or more bulges 8a, 8b, 9a, 9b in the nonwoven material 1, the nonwoven material 1 is to that end preferably introduced into the embossing device 11 in flat state.

The nonwoven material 1 is folded in work step 102. To that end, the apparatus 10 comprises at least one folding device 12 configured to form a plurality of folds 2a, 2b, 2c in the nonwoven material 1, these running preferably substantially parallel to one another. The folds 2a, 2b, 2c thereby divide the nonwoven material 1 into first limbs 3a, 3b and second limbs 4a, 4b, whereby the nonwoven material 1 is folded so as to produce a zigzagged configuration of the nonwoven material 1.

In a final work step 103, at least one area of the first limb 3a, 3b is materially bonded to at least one area of the second limb 4a, 4b of a fold 2a, 2b, 2c by the formation of weld regions 5a, 5b. This ensues in the apparatus 10 by means of a welding device 13, wherein the welding device 13 is designed such that the weld regions 5a, 5b are only formed on facing sides of the limbs 3a, 3b, 4a, 4b of a fold 2a, 2b, 2c; i.e. there is substantially no structural change to the surface of the sides of the limbs 3a, 3b, 4a, 4b of a fold 2a, 2b, 2c faced away from one another resulting from the welding. Preferably, substantially all the weld regions are at least partially formed at or on the bulges. Preferably, the welding device 13 comprises a heating element 14 which enters between the limbs 3a, 4a; 3b, 4b for welding and heats the surfaces of the nonwoven material 1 in the weld regions 5a, 5b, whereby the weld regions 5a, 5b come into contact or are brought into contact as the heating element 14 exits and form at least one welded joint, in particular a weld seam. The heating element 14 serves to apply thermal energy in order to be able to plasticize the surfaces of the nonwoven material 1. Preferably, the heating element 14 is configured for thermal-contact welding, ultrasonic welding, infrared welding and/or laser welding. In the case of thermal-contact welding, the heating element can be designed as a heating rod or heating wire. In any case, however, the heating element 14 is designed so as to form spot or elongated joints between the limbs.

To join the weld regions 5a, 5b, the heating element 14 is preferably inserted between adjacent limbs 3a, 4a; 3b, 4b, or into the fold 2a, 2b, 2c they form respectively, and then extracted again, whereby the weld regions 5a, 5b in the folds can be heated. The direction of movement B of the heating element 14 is thereby oriented at least substantially perpendicular, preferably vertically, to the direction of manufacture H. Further preferably, the direction of movement B additionally comprises a component aligned at least substantially parallel to the direction of manufacture H. This can thereby comparatively increase the production speed; i.e. the speed at which the nonwoven material 1 moves in the direction of manufacture H, in the area of the welding device 13.

Additionally to be noted is that the exemplary embodiments are only examples which are not intended to limit the scope of protection, the applications and configuration in any way. Rather, the foregoing description is to provide the person skilled in the art with a guideline for implementing at least one exemplary embodiment, whereby various modifications can be made, particularly as regards the function and arrangement of the described components, without departing from the scope of protection resulting from the claims and equivalent combinations of features.

LIST OF REFERENCE NUMERALS

1 nonwoven material
2a, 2b, 2c fold
3a, 3b first limb
4a, 4b second limb
5a, 5b weld region
6 first surface
7 second surface
8a, 8b first bulge
9a, 9b second bulge
10 apparatus
11 embossing device
12 folding device
13 welding device
14 heating element
L longitudinal direction of fold
H direction of manufacture
B direction of movement

The invention claimed is:

1. A method for producing a zigzag-folded nonwoven material for a filter, wherein the nonwoven material is produced by a melt-spinning process, comprising the following work steps:
   folding the nonwoven material by means of a folding device, whereby a plurality of folds results, wherein the folds divide the nonwoven material into first limbs and second limbs such that the nonwoven material is folded in zigzag form; and subsequently
   welding a weld region of the first limb of a fold to at least one weld region of the second limb of a fold in a plastic welding process, wherein a welded joint is formed between the two facing sides of the limbs of a fold, wherein during the welding a heating element or a plurality of heating elements enter(s) between the limbs of a fold and heats the weld regions, whereby the weld regions come into contact or are brought into contact as the heating element exits and form at least one welded joint, in particular a weld seam.

2. The method according to claim 1, wherein folds are welded on both sides of the nonwoven material.

3. The method according to claim 1 further comprising the following work step:
   embossing at least one bulge in the first limb and/or at least one bulge in the second limb of a fold such that the bulges face one another.

4. The method according to claim 1, wherein the heating element enters between the limbs at least substantially in a direction perpendicular to the direction of manufacture of the nonwoven material and wherein an average travel speed value of the heating element is greater, preferably 10 to 100 times greater, than a travel speed of the already folded nonwoven material in the direction of manufacture.

5. The method according to claim 4, wherein the heating element additionally moves in the direction of manufacture of the nonwoven material.

6. An apparatus for producing a zigzag-folded nonwoven material for a filter, and/or for realizing a method according to claim 1, which comprises:
   at least one folding device configured to form a plurality of folds which divide the nonwoven material into first limbs and second limbs such that the nonwoven material is folded in zigzag form; and at least one welding device configured to weld a weld region of the first limb of a fold to at least one weld region of the second limb of a fold between the limbs of a fold in the folded state by means of a plastic welding process, wherein a welded joint is formed between the two facing sides of the limbs of a fold, wherein the welding device comprises a heating element configured to be inserted between the limbs and to heat the weld regions, wherein the regions come into contact as the heating element exits and form a weld region.

7. The apparatus according to claim 6, wherein the welding device additionally comprises a counter-welding element, in particular a welding anvil, which is configured to be inserted between the limbs of an adjacent fold such that the heating element and the counter-welding element enclose the at least one weld region.

8. The apparatus according to claim 6, wherein the apparatus comprises a second welding device and is designed such that the heating elements of the two welding devices are inserted between the limbs from opposite sides of the nonwoven material.

9. The apparatus according to claim 6, further comprising:

at least one embossing device configured to emboss at least one bulge in the first limb and/or at least one bulge in the second limb of a fold such that the bulges face one another.

10. The apparatus according to claim 6, wherein the at least one welding device is further configured to move the heating element in the direction of manufacture of the nonwoven material.

\* \* \* \* \*